United States Patent Office 3,491,100
Patented Jan. 20, 1970

3,491,100
5- OR 7-AMIDOMETHYLENE-8-HYDROXY-QUINOLINES
Paul Schaefer, Riehen, Helmut Huber-Emden, Basel, Hans-Rudolf Hitz, Muttenz, and Arthur Maeder, Therwil, Switzerland, assignors to Ciba Limited, Basel, Switzerland, a company of Switzerland
No Drawing. Filed Dec. 19, 1966, Ser. No. 602,514
Claims priority, application Switzerland, Dec. 23, 1965, 17,733/65
Int. Cl. C07c 33/44; A61l 13/00
U.S. Cl. 260—287   5 Claims

ABSTRACT OF THE DISCLOSURE

New 8-hydroxyquinolines are provided in which at least one residue of an N-methylamide of an ethylenically unsaturated α-halogen substituted acid or of an aliphatic α,β-dihalogen substituted acid is linked by the carbon atom of its methylamide group with a cyclic carbon atom of an 8-hydroxyquinoline residue. The compounds of this invention are especially useful in compositions for controlling microorganisms.

---

The present invention provides new 8-hydroxyquinolines in which at least one residue of an N-methylamide of an ethylenically unsaturated α-halogen substituted acid or of an aliphatic α,β-dihalogen substituted acid is linked by the carbon atom of its methylamide group with a cyclic carbon atom of an 8-hydroxyquinoline residue.

Particularly valuable are the 8-hydroxyquinolines of the formula (1)

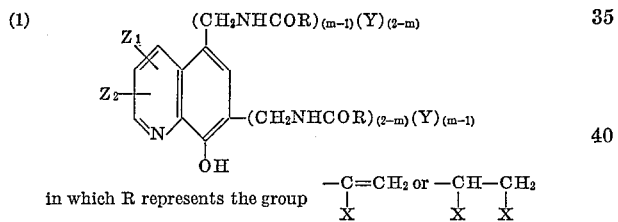

in which R represents the group $$-\underset{X}{\overset{|}{C}}=CH_2 \text{ or } -\underset{X}{\overset{|}{C}H}-\underset{X}{\overset{|}{C}H_2}$$

(where X stands for a chlorine or preferably bromine atom), Y represents a halogen atom or an alkyl radical with 1 to 4 carbon atoms, $Z_1$ and $Z_2$ each represents a hydrogen or chlorine atom or an alkyl radical with 1 to 4 carbon atoms, and $m=1$ or 2.

In the 8-hydroxyquinolines of the Formula 1 the N-methylamide residue is bound in position 5 or 7 with the 8-hydroxyquinoline residue. The compounds correspond, for example, to the formula

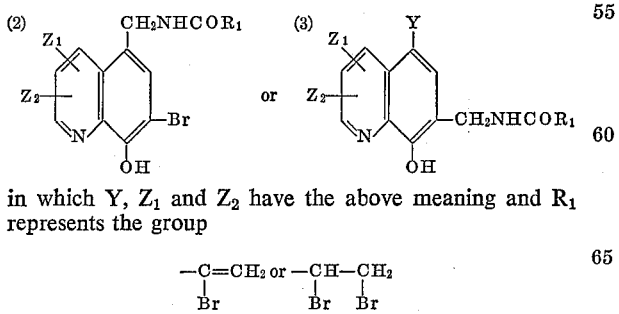

in which Y, $Z_1$ and $Z_2$ have the above meaning and $R_1$ represents the group $$-\underset{Br}{\overset{|}{C}}=CH_2 \text{ or } -\underset{Br}{\overset{|}{C}H}-\underset{Br}{\overset{|}{C}H_2}$$

All these 8-hydroxyquinolines are accessible by the following three known methods:
(a) Condensation of 8-hydroxyquinolines with N-methylol-α-halogen-acrylamides, for example

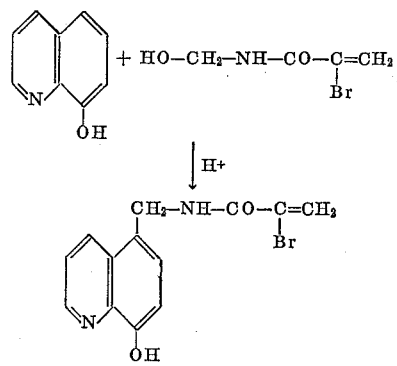

(b) Condensation of 8-hydroxyquinolines with N-methylol-1,2-dihalogeno-proprionamides and, if desired, subsequent elimination of hydrogen halide, for example

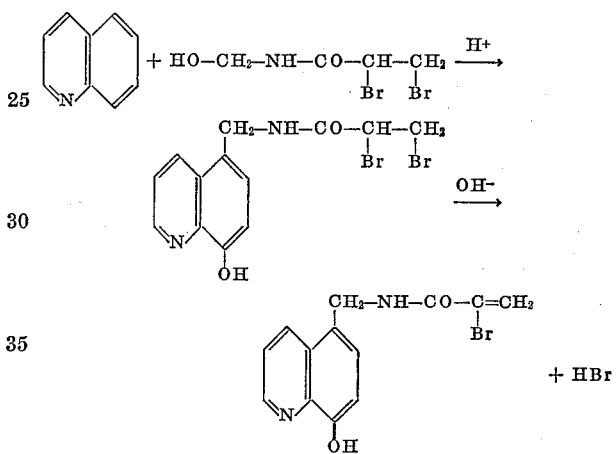

(c) Addition of halogen on to acrylamidomethyl-8-hydroxyquinolines to form 1,2-dihalogeno-propionamidomethyl-8-hydroxyquinolines and, if desired, subsequent elimination of hydrogen halide, for example

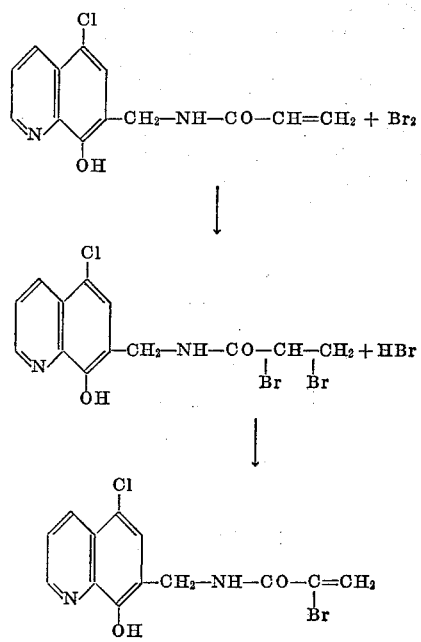

If the starting material used in variant (c) still contains reactive positions in the nucleus, then these positions are likewise halogenated, for example

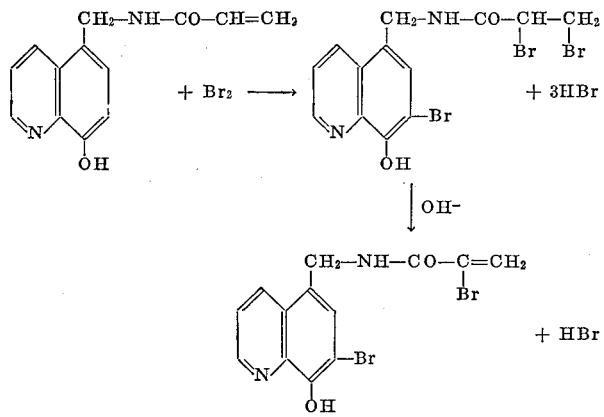

Depending on the starting materials chosen there are thus obtained 8-hydroxyquinolines of the Formula 2 or 3. As examples of N-methylolamides, or their alkyl ethers with 1 to 4 carbon atoms, suitable for the manufacture of the new 8-hydroxyquinolines according to variant (a), there may be mentioned the N-methylolamides, or their alkyl ethers, of α-chloracrylic and α-bromacrylic acid.

As examples of 8-hydroxyquinolines to be reacted with the N-methylolamides by method (a) or (b) there may be mentioned:

8-hydroxyquinoline,
5-chloro-8-hydroxquinoline,
5-methyl-8-hydroxyquinoline,
2-methyl-8-hydroxyquinoline,
2,4-dimethyl-8-hydroxyquinoline and
3-chloro-8-hydroxyquinoline.

The acid reaction medium used in the condensation according to methods (a) and (b) is advantageously prepared by adding sulphuric acid. As a rule it is advisable to use as solvent concentrated sulphuric acid, preferably of 98% strength. The reaction mixture should contain as little water as possible and need not be heated as a rule; it suffices to leave it to itself for a prolonged period, for example for 20 to 100 hours at 20° C., if possible with exclusion of air. It is also of advantage to add an inhibitor, for example thiodiphenylamine.

Bromination of the corresponding halogen-free acrylamido-methyl-8-hydroxyquinolines by method (c) furnished, for example, also the following preferred monomers:

(4) 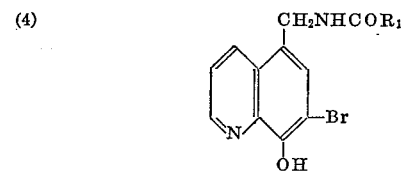

(5) 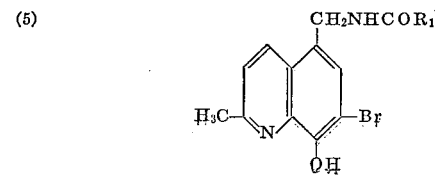

(6) 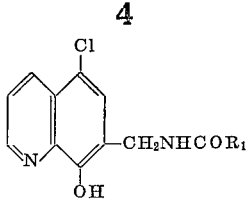

in which $R_1$ has the above meaning.

The 8-hydroxyquinolines of this invention are used in the control of microorganisms, if desired in combination with a vehicle. These preparations may be present in a wide variety of forms of application, for example in the form of pastes, powders, emulsions, suspensions, solutions or sprays. Accordingly, a wide variety of vehicles may be used:

For the manufacture of solutions for direct spraying there may be used, for example, mineral oil fractions of medium to high boiling range, such as Diesel oil or kerosene, also coal tar oils and oils of vegetable or animal origin, as well as hydrocarbons such as benzene, cyclohexane, alkylated naphthalenes, tetrahydronaphthalene, if desired with the use of xylene mixtures, cyclohexanols, ketones, also chlorinated hydrocarbons such as chloroform, tetrachlorethane, trichlorethylene or tri- and tetrachlorobenzenes.

Aqueous forms of application are prepared from emulsion concentrates, pastes or wettable spray powders by the addition of water.

To manufacture casting and dusting preparations there may be used as solid vehicles talcum, kaolin, bentonite, calcium carbonate or phosphate, or coal, cork meal and wood meal and other materials of vegetable origin. The various forms of application may as usual contain further auxiliaries such as solvents, diluents, dispersants, wetting agents or adhesives.

The new 8-hydroxyquinolines can be firmly fixed on wool and cotton in an acid or alkaline liquor, whereby they impart to the fabric antimicrobial properties which, in view of the chemical fixation, are particularly resistant to washing. Fixation is achieved very simply by impregnation with an aqueous solution, for example by padding and fixing in a steam bath or in a hot, aqueous fixing bath.

Unless otherwise indicated, parts and percentages in the following examples are by weight. The relationship between part by weight and part by volume is the same as that between the gram and the millilitre.

EXAMPLE 1

13.1 parts of 5-chloro-7-acrylamidomethyl-8-hydroxyquinoline are dissolved with heating in 300 parts by volume of glacial acetic acid. Then 0.1 part of hydroquinone is added and in the course of 30 minutes a solution of 7.99 parts of bromine in 20 parts by volume of glacial acetic acid is added, and the whole is vigorously stirred for another 6 hours. The precipitate formed is suctioned off, washed with a small quantity of glacial acetic acid and then thoroughly rinsed with water, to yield the product of the formula (7) 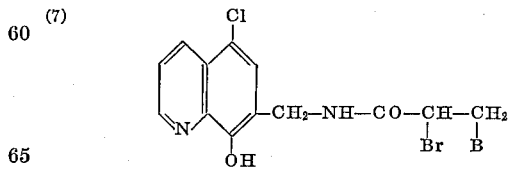

EXAMPLE 2

The product of the Formula 7 is added at 50° C. to a solution of 8 parts of sodium hydroxide in 500 parts by volume of water; the mixture is vigorously stirred at this temperature, then suction-filtered while still hot and adjusted with 2 N-sulphuric acid to pH=8. The precipitate formed is suctioned off, thoroughly washed with water, and dried. The resulting product corresponds to the formula (8) 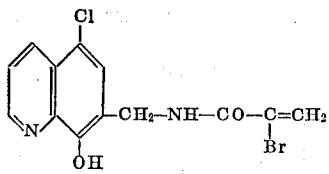

On recrystallization from cyclohexane it melts at 143 to 144° C.

*Analysis.*—Calculated: C, 45.7; H, 2.9; N, 8.2. Found: C, 46.0; H, 3.0; N, 8.0.

EXAMPLE 3

11.4 parts of 5-acrylamidomethyl-8-hydroxyquinoline are dissolved in 70 parts by volume of glacial acetic acid. Then 0.1 part of hydroquinone and 4.5 parts of anhydrous sodium acetate are added, whereupon a solution of 16 parts of bromine in 20 parts by volume of glacial acetic acid is dropped in within 30 minutes. The mixture heats up and this is compensated by external cooling so that the reaction temperature is 40° C. The batch is then stirred for 1 hour. The precipitate formed is suctioned off, washed with a small quantity of glacial acetic acid and then thoroughly with water, and dried, to yield 23 parts (=98% of theory) of the compound of the formula (9) 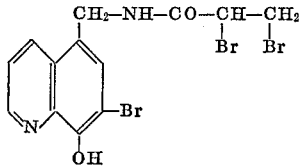

On recrystallization from glacial acetic acid it melts at 201 to 204° C.

*Analysis.*—Calculated: C, 33.4; H, 2.4; Br, 51.3. Found: C, 33.6; H, 2.6; Br, 50.4.

EXAMPLE 4

23 parts of substance (9) [crude product of Example 3] are stirred at 50° C. into a solution of 4 parts of sodium hydroxide in 1000 parts by volume of water and vigorously stirred for ½ hour at this temperature. The batch is suction-filtered while still hot and the filtrate is adjusted with 2 N-sulphuric acid to pH=8. The precipitate formed is suctioned off, thoroughly washed with water and dried, to yield 12.4 parts (=65% of theory) of the compound of the formula

(10) 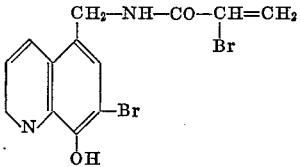

On recrystallization from benzene with the addition of active carbon the compound melts at 164 to 165° C.

*Analysis.*—Calculated: C, 40.6; H, 2.6; Br, 41.4. Found: C, 40.7; H, 2.8; Br, 41.4.

EXAMPLE 5

12.1 parts of 5-acrylamidomethyl-8-hydroxyquinaldine, 4.5 parts of anhydrous sodium acetate and 0.1 part of hydroquinone are dissolved in 130 parts by volume of glacial acetic acid, then within 30 minutes a solution of 16 parts of bromine in 20 parts by volume of glacial acetic acid is dropped in. The batch heats up and is maintained by external cooling at 30° C. then stirred on for 1 hour. The precipitate formed is suctioned off and washed with a small quantity of glacial acetic acid and abundantly with water. A specimen of the resulting product of the formula

(11) 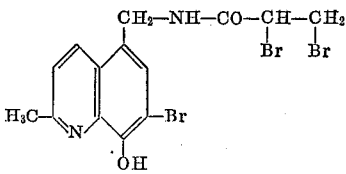

form on recrystallization from glacial acetic acid fine needles that turn brown above 190° C. and do not melt up to 280° C.

*Analysis.*—Calculated: C, 35.0; H, 2.7; Br, 49.8. Found: C, 35.4; H, 2.8; Br, 49.5.

EXAMPLE 6

The product of Example 5 is vigorously stirred into a solution, heated at 50° C. of 4.4 parts of sodium hydroxide in 1000 parts by volume of water. The mixture is further vigorously stirred for one hour, suction-filtered while still hot, and the filtrate is saturated with carbon dioxide. The precipitate formed is suctioned off, washed with water and dried, to yield 8.3 parts (=41.5% of theory referred to the 5-acrylamidomethyl-8-hydroxyquinaldine used) of the product of the formula

(12) 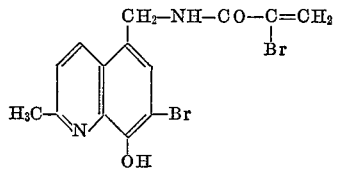

which on recrystallization from chloroform melts at 150 to 152° C.

*Analysis.*—Calculated: C, 42.0; H, 3.0; Br, 39.9. Found: C, 42.1; H, 3.0; Br, 39.6.

EXAMPLE 7

Measuring the minimal inhibitory concentration (MIC) against bacteria and fungi in the dilution test The MIC (minimal inhibitory concentration) is determined by a test derived from the standard specifications, which produces an approximately to the absolute minimal inhibitory values of an active substance.

A solution of 1% and 0.3% strength each of the active substances in dimethylsulphoxide are introduced in small tubes containing sterile glucose broth (bacteria) and beerwort solution respectively (fungi), and with these solutions dilution series at 10× steps are prepared. By combining the two series the following continuous dilution series is obtained: 1000, 300, 100, 30, 10, 3 parts per million and so on.

The solutions are inoculated with the bacteria *Staphylococcus aureus* and *Escherichia coli* and with the fungi *Aspergillus niger* and *Rhizopus nigricans* respectively. Then in the case of the bacteria, the solutions are incubated for 48 hours at 37° C. (bacteriostatic test) and in the case of the fungi for 72 hours at 25° C. (fungistatic test). After these incubation periods the minimal inhibitory values in parts per million shown in the following Table are found:

| Compound of formula | Aspergillus niger | Rhizopus nigricans | Staphylococcus aureus | Escherichia coli |
|---|---|---|---|---|
| (9) | 100 | 30 | 30 | 100 |
| (10) | 10 | 30 | 30 | 100 |

EXAMPLE 8

(a) 2 parts of the finely ground compound of the formula 10 are stirred into a solution, heated to 80° C., of 2 parts of sodium carbonate and 5.2 parts by volume of N-sodium hydroxide solution in 100 parts by volume of distilled water, whereupon the compound is completely dissolved with yellow coloration.

A cotton fabric is padded with this solution at 80° C., then expressed to a moisture content of 100% and finally dried at room temperature.

Fixing is performed for 45 minutes at 80 to 90° C. in a bath containing 25 parts of sodium sulphate and 3 parts of sodium carbonate in 100 parts by volume of water. The fabric is then rinsed in cold water and dried at room temperature.

(b) A piece of fabric is treated as under (a) and then further for 2 hours with 5% acetic acid as a goods-to-liquor ratio of 1:30.

In cultures of *Aspergillus niger*, *Escherichia coli* and *Staphylococcus aureus* fabrics treated as described reveal the following extent of surface infestation (in percent of fabric surface) and inhibitory zones (in mm.) respectively:

|  | Tel quel | Rinsed for 24 hours at 29° C | Tel quel | Rinsed for 24 hours at 29° C |
|---|---|---|---|---|
| *Aspergillus niger* | 2 mm | 25% | 0% | 50% |
| *Staphylococcus aureus* | 5 mm | 2 mm | 2 mm | 1 mm |
| *Escherichia coli* | 2 mm | 0% | 0% | 0% |

The microbial dressings are effective against the 3 organisms tested and are not impaired by rinsing in water.

The dressings also remain effective after an acid treatment (b).

What is claimed is:
1. An 8-hydroxyquinoline of the formula

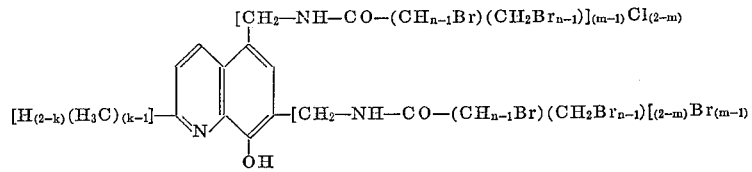

wherein $k$, $m$ and $n$ each represents a whole number of at the most 2.

2. The 8-hydroxyquinoline according to claim 1 of the formula

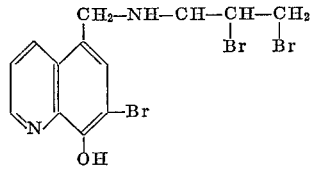

3. The 8-hydroxyquinoline according to claim 1 of the formula

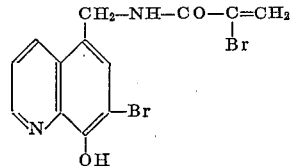

4. The 8-hydroxyquinoline according to claim 1 of the formula

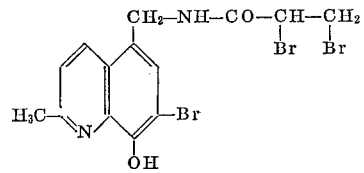

5. The 8-hydroxyquinoline according to claim 1 of the formula

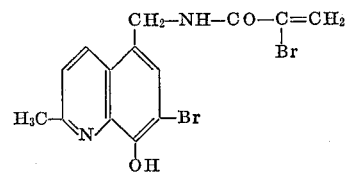

References Cited

UNITED STATES PATENTS 2,411,670  11/1946  Senn _____ 260—289
2,666,058  1/1954   Neher _____ 260—287 X
3,391,114  7/1968   Schaefer et al. _____ 260—47

DONALD G. DAUS, Primary Examiner

U.S. Cl. X.R.

8—116.2, 127.6; 260—561; 424—258

PO-1050
(5/69)

UNITED STATES PATENT OFFICE
CERTIFICATE OF CORRECTION

Patent No. 3,491,100      Dated January 20, 1970

Inventor(s) PAUL SCHAEFER ET AL

It is certified that error appears in the above-identified patent and that said Letters Patent are hereby corrected as shown below:

Column 7, line 35, delete formula and insert ---

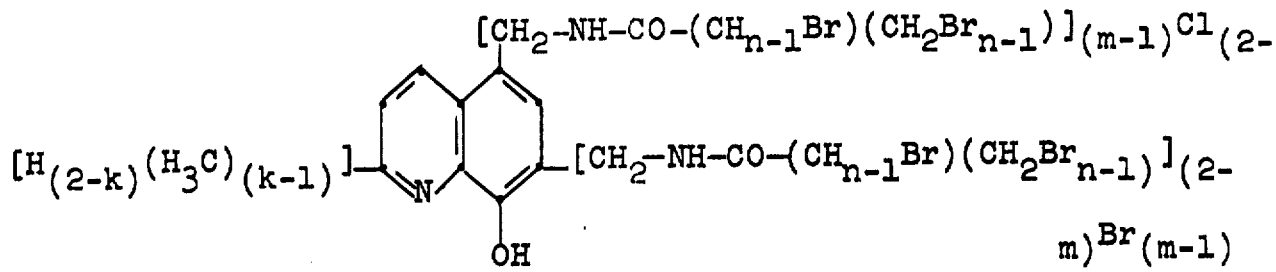

---;

Column 7, line 45, delete formula and insert ---

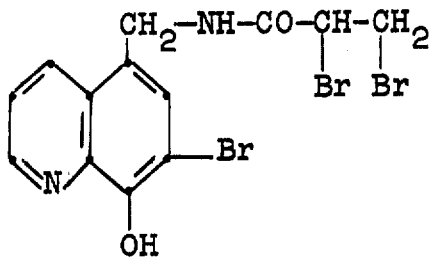

---;

SIGNED AND
SEALED
MAR 9 1971

(SEAL)
Attest:

Edward M. Fletcher, Jr.
Attesting Officer

WILLIAM E. SCHUYLER, JR.
Commissioner of Patents